INVENTORS
EDWARD FEUERSTEIN
LOUIS FEUERSTEIN

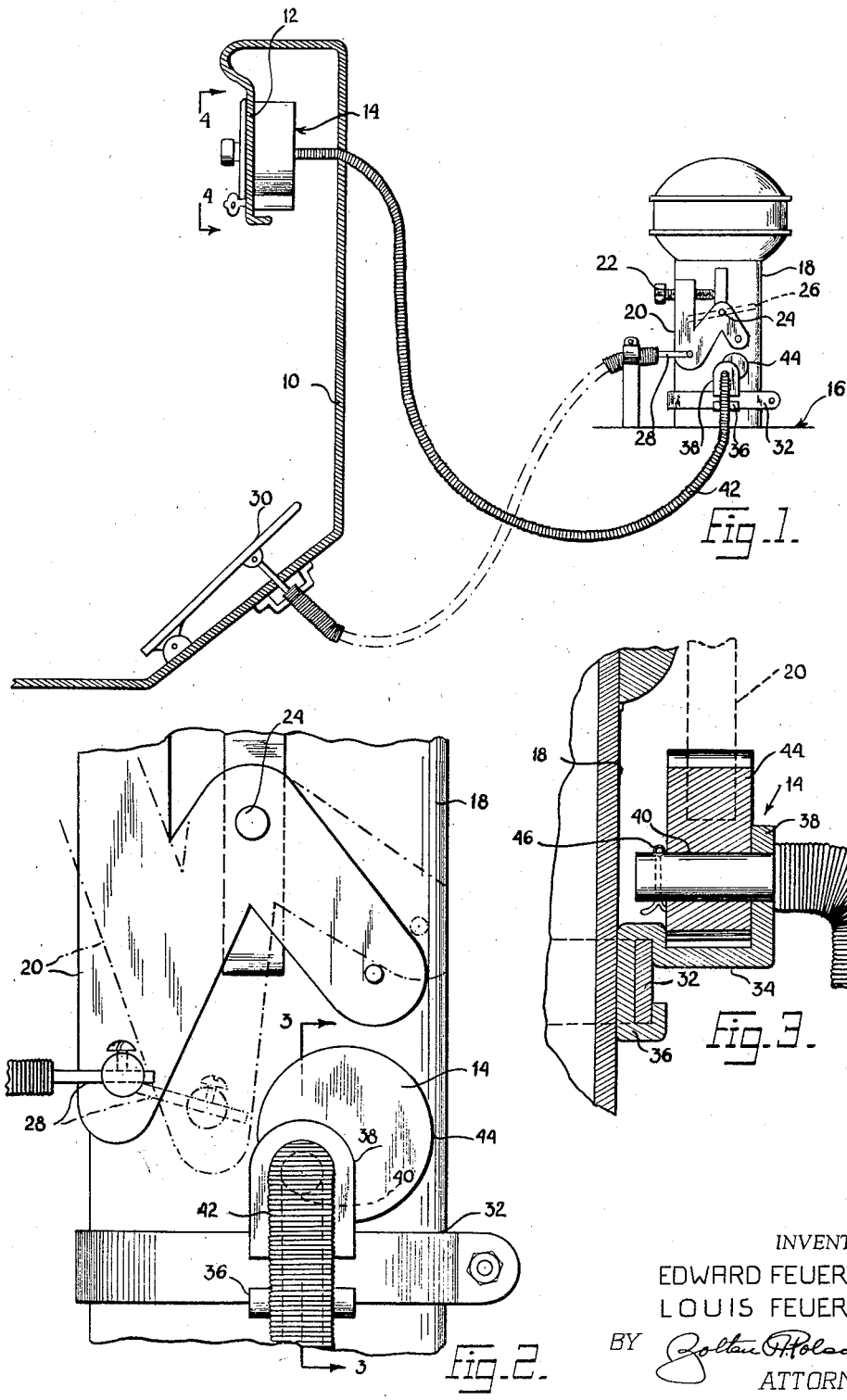

ATTORNEY

Dec. 30, 1958   E. FEUERSTEIN ET AL   2,866,446
SPEED CONTROL GOVERNOR DEVICE FOR AUTOMOBILES
Filed March 1, 1957   3 Sheets-Sheet 3
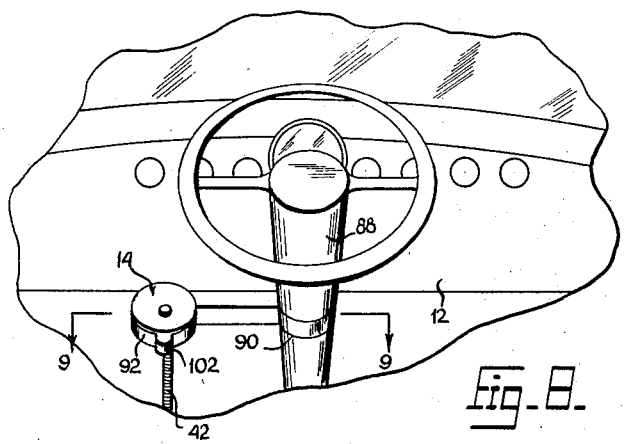
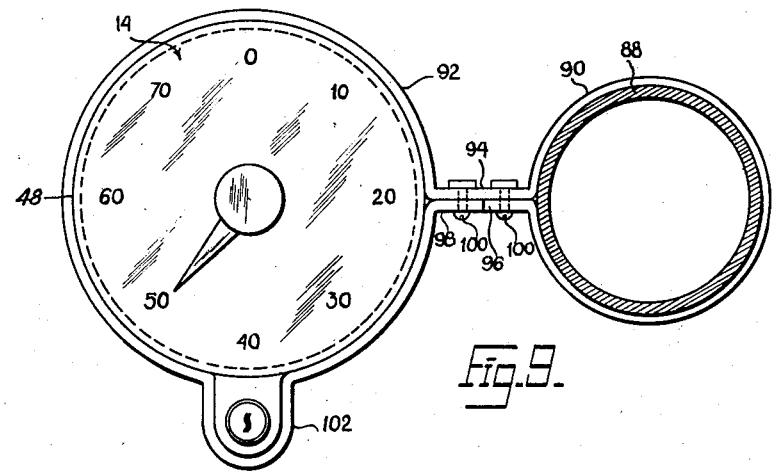
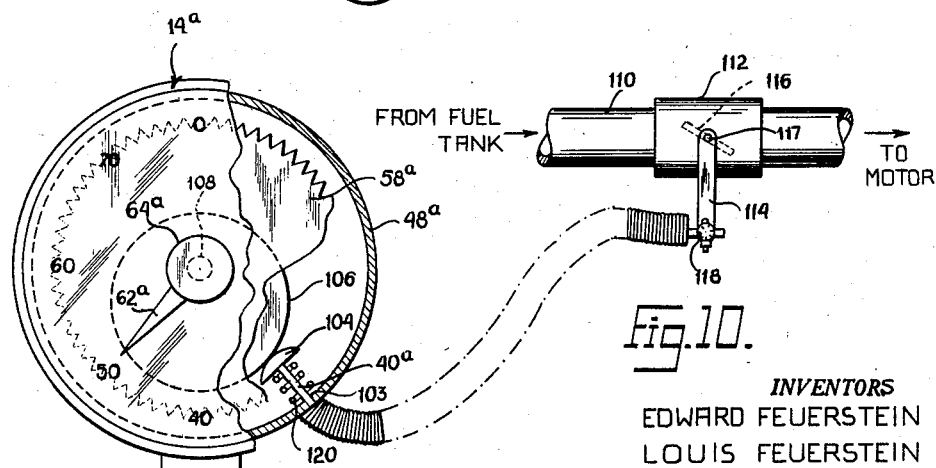
*INVENTORS*
EDWARD FEUERSTEIN
LOUIS FEUERSTEIN
BY
*ATTORNEY*

United States Patent Office 2,866,446
Patented Dec. 30, 1958

2,866,446

SPEED CONTROL GOVERNOR DEVICE FOR AUTOMOBILES

Edward Feuerstein and Louis Feuerstein, Brooklyn, N. Y.

Application March 1, 1957, Serial No. 643,393

7 Claims. (Cl. 123—98)

This invention relates to speed control devices for automotive vehicles, that is, devices having the adaptability for limiting the maximum speed at which the vehicle is to operate.

The main object is to provide a generally improved device of this nature, adapted to be used as a governor, under the control of the vehicle operator, so that no one can operate the vehicle above a speed which has been previously established by the vehicle owner.

The invention, thus, has a desirable safety characteristis, in that it is so designed that when mounted upon a vehicle and set at a predetermined, selected setting by the vehicle owner, the vehicle cannot thereafter be operated above a predetermined, maximum speed found to be appropriate for safe operation, unless changed by a person with a key.

Often, a vehicle is driven by someone other than the owner thereof. In these circumstances, the person operating the vehicle may tend to drive the vehicle at an excessive speed, thus creating dangerous driving conditions without the knowledge of the vehicle owner. Not only does this tend to raise the hazard of an accident, but also, the vehicle is subjected to excessive wear and tear, as well as to excessive operating costs due to the rapid consumption of fuel when a vehicle is operating at high speeds.

According to the present invention, a device is incorporated in the mechanism that controls the engine speed, in such a manner that not only can the vehicle operator or owner predetermine the maximum speed at which the vehicle will be permitted to operate, but also, will be able to lock the device at the desired setting, so that it cannot thereafter be changed by anyone, except the person who has the key.

A further object is to provide a speed control safety device which will be capable of installation on a vehicle at relatively low cost, and with maximum ease and speed, without modification of existing components of the vehicle other than to a relatively inconsequential extent.

A further object is to so design the device as not to interfere with normal operation of the vehicle at speeds below the maximum speed permitted.

Still another object is to provide a governor or speed control device as described that will be very simple in design, so as to permit its manufacture at a very low cost, as compared to certain devices of a generally similar purpose heretofore conceived, which devices have tended to be so complex as to militate against commercial production thereof.

A further object is to provide a device which will operate on principles that will permit it to be used in connection with any type of vehicle fuel supply system, that is, either a carburetor or fuel injection type of fuel supply, the device further being designed to be used with any type of transmission in use today.

Another object is to provide a speed control device of the character described that will be so formed as to be mountable either in the dash or instrument panel of the vehicle, or upon the steering post, whichever is desired.

Still another object is to provide a speed control device that will be swiftly adjusted under the control of the vehicle owner or a person with the key, to any of a large number of positions of adjustment, so as to control with maximum accuracy the speed at which the vehicle is permitted to operate, while still permitting a wide range of adjustments as to said maximum speed.

Still another object is to provide a speed control device that will not interfere with normal operation of the engine, will not result in excessive consumption of fuel, and will not require relocation or removal of existing components of the vehicle engine or of adjacent portions of the vehicle body.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a somewhat diagrammatic sectional view through the fire wall of a vehicle, illustrating the device mounted in place upon the instrument panel, and showing the connection between the device and the carburetor of the engine.

Fig. 2 is an enlarged, fragmentary side elevational view of the carburetor and of the adjacent portions of the speed control device.

Fig. 3 is a sectional view, on the same scale as Fig. 2, substantially on line 3—3 of Fig. 2.

Fig. 8 is a front elevational view of an instrument panel showing the device mounted upon the steering post of the vehicle.

Fig. 9 is an enlarged sectional view on line 9—9 of Fig. 8.

Fig. 10 is a view partly in elevation and partly in section, portions being broken away, showing the device modified for controlling the speed of an engine, the fuel of which is supplied by the fuel injection type of system.

Figure 4:
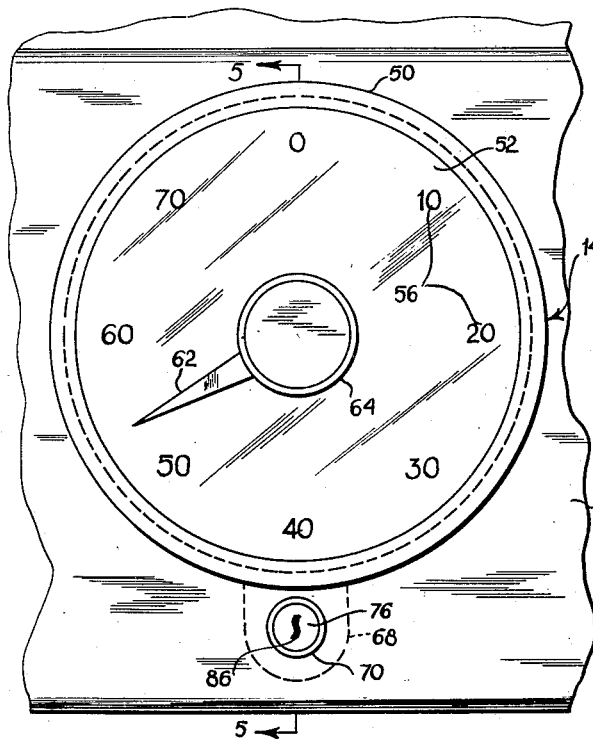
Fig. 4 is a fragmentary front elevational view of the instrument panel on an enlarged scale, with the device being illustrated in position upon the instrument panel.

Referring to the drawings in detail, in the form of the invention shown in Figs. 1–7, the device controls the throttle setting on a carburetor. Thus, illustrated in Fig. 1 is a conventional fire wall 10 of an automotive vehicle, and spaced from the fire wall is the instrument panel 12 of the vehicle. The safety control device constituting the present invention has been generally designated 14, and in Figs. 1–7 has a dial mounted in instrument panel 12.

The vehicle, as is usual, includes the internal combustion engine 16 having a carburetor 18 at the side of which is mounted an arm 20 carrying an idle adjustment screw 22 and pivoted at 24 on the outside wall of the carburetor. The arm is swung from its normal, idle position shown in full lines in Fig. 2 to any of various positions adapated to open the throttle valve 26 to a selected extent. Arm 20 is swung by means of a Bowden cable 28 which is shifted responsive to depression of the accelerator 30 of the vehicle.

Thus, on depression of the accelerator, arm 20 is swung counterclockwise in Figs. 1 and 2, to shift the throttle valve 26 to a selected, open position, for permitting a quantity of fuel to pass through the carburetor. As is usual, the greater the movement of the arm 20 from its normal position, the greater will be the fuel opening of the carburetor, with the engine speed being thus correspondingly increased.

The purpose of the speed control device 14 constituting the present invention is to limit the maximum speed of the vehicle. In accordance with the invention, this is done by any of various means, and by way of example of the principles of the invention there is shown in Figs. 1–7 a cam means which is adjustably settable for the purpose of engaging the arm 20 after the arm 20 has swung counterclockwise from its normal position to a selected degree. In this way, the extent of swinging movement is controlled, so that the throttle opening of the carburetor is in turn controlled as to its maximum size, thus preventing operation of the engine at greater than a predetermined speed found to be safe and desirable as regards the speed of movement of the vehicle.

The speed control device includes components mountable on the instrument panel and carburetor respectively, and the component carried by the carburetor is supported by a split clamping ring 32 extending about the carburetor as shown in Figs. 1 and 2. Referring to Fig. 3, bracket 34 formed of a rigid, strap metal material includes at one end a depending, flanged portion 36 engaged fixedly between the side wall of the carburetor and the clamp 32. At its other end, bracket 34 has an upwardly projecting extension 38 formed with a bearing opening in which is rotatable a flexible shaft 40 adapted to rotate within a sheath 42. Shaft 40, between the extension 38 and the side wall of the carburetor, extends through an opening of an eccentric or cam 44. The shaft 40 is eccentric to the center of the circular cam disc 44, as shown in Fig. 2, with the cam disc being press-fitted upon or otherwise fixedly secured to the shaft. The cam could, thus, be welded to the shaft to prevent any possibility of rotation of the cam relative to the shaft. Any other suitable means may be employed for the purpose of insuring that the cam cannot under any circumstances be rotated relative to the shaft. In the illustrated example the cam has a tight fit upon the shaft, causing the shaft and cam to turn together, and to insure against accidental movement of the cam off the shaft there is provided a cotter key 46 extending through a transverse opening of the shaft.

The eccentric disc 44 rotates in a plane common to that of the arm 20. As a result, the disc will be disposed in the path of swinging movement of the arm as shown in Fig. 2. By selected positioning of the disc, the extent of swinging movement of the arm from its normal, full line position of Fig. 2 can be governed. If, for example, the disc 44 were to be turned from its Fig. 2 position in a counterclockwise direction, the extent of swinging movement of the arm 20 would be reduced, as compared to the swinging movement that is permitted for the arm in the illustrated position of the cam disc.

The adjustable positioning of the cam disc is effected by the vehicle owner, or by any other individual having the key, and once the cam disc is set at the desired position, it cannot thereafter be moved from said position except by the owner or person with a key. The arrangement, further, is so designed as to prevent unauthorized tampering with the speed control device for the purpose of changing the setting of the cam.

In any event, the eccentric disc is positioned by means of a mechanism mounted on the instrument panel or steering post and operable by the vehicle owner or other person with a key. Said mechanism is illustrated to particular advantage in Figs. 4–7 and includes a hollow, circular casing 48 opening forwardly and adapted to be mounted in an opening of the instrument panel. Casing 48 at its forward edge has an outwardly directed flange or lip 50 engaging the edge portion of the instrument panel opening, and the casing would be secured to the instrument panel by any of various conventional means already well known in the art of installation of instruments on vehicle panels.

A cover glass 52 is provided in the front of the casing, and overlies a dial 54 having a peripheral series of indicia 56 which may ascend in value in a clockwise direction from zero to any desired number, as, for example, eighty miles per hour.

Within the casing 48 there is provided a large diameter disc or wheel 58, which is formed with a hub 60 through which extends the flexible shaft 40, the hub having a setscrew therein engageable with the shaft 40 for the purpose of securing the disc 58 to the shaft for rotation therewith.

The shaft 40 projects through a center opening of the dial 54, and immediately in front of the dial carries an index arm 62 which is rotatable with and extends radially from the shaft 40, to traverse the series of calibrations or indicia 56 (see Fig. 4). The shaft projects through a center opening of the dial cover glass, with the forwardly projecting end of the shaft being engaged in a turning knob 64.

From the construction so far illustrated and described, it will be apparent that the knob 64 can be rotated by a user, to turn the shaft 40. This will result in the cam or eccentric 44 (Fig. 2) being turned to a corresponding extent, so as to adjustably position the eccentric for the purpose of correspondingly adjustably limiting the throw or swinging movement of the arm 20.

Means is provided for preventing rotation of the shaft by means of the knob, except under the control of the vehicle owner or other individual with a key. Said means includes a circumferential series of notches 66 formed in the periphery of the disc 58.

Figure 5:
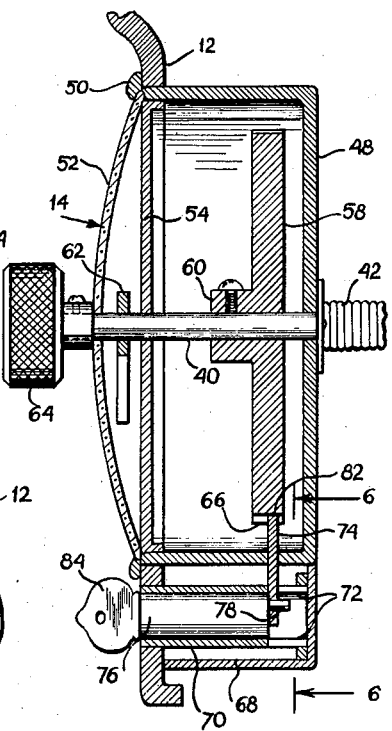
Fig. 5 is a sectional view through the panel-mounted components of the device, taken substantially on line 5—5 of Fig. 4, on the same scale as Fig. 4.
Figure 6:
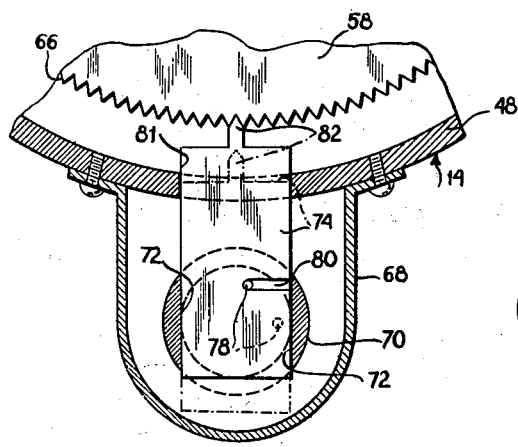
Fig. 6 is a detail sectional view, still further enlarged substantially on line 6—6 of Fig. 5, showing the means for locking the device at the selected setting.
Figure 7:
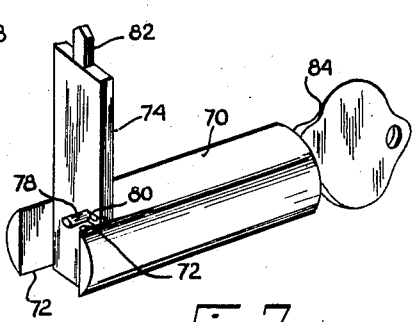
Fig. 7 is a rear perspective view, still further enlarged, of the locking plate, key, and barrel of the lock means.

A key-operated means is provided for engaging in a notch 66 in any position to which the disc 58 is turned. Said means is shown in Figs. 5–7 and includes a housing 68 secured by screws or equivalent means to the underside of the casing 48. Fixedly mounted within the housing is a cylindrical barrel 70, the forward end of which opens through the instrument panel below the dial, as shown in Fig. 4. In the inner end of the barrel 70 there are provided diametrically opposite, wide guide slots 72 in which is slidably engaged a vertically shiftable locking plate 74. A rotatable cylinder 76 is provided, at its inner end, with a lug 78 positioned eccentrically to the axis of rotation of the cylinder 76, and extending into a transverse slot 80 formed in the lock plate and opening upon one side of the lock plate.

The upper end portion of the lock plate is slidably engaged in a slot 81 formed in the casing 48, and within the casing 48 the lock plate has an upwardly projecting tooth 82 engageable in any notch 66 which may happen to be in registration with the tooth.

The cylinder 76, it will be understood, is basically conventional in the key art, in that it cannot be turned except after a suitable key 84 has been inserted in a keyhole 86. The key, if it fits within the keyhole, may then be turned with the cylinder ninety degrees from the normal position shown in Fig. 5, and in these circumstances, the pin or lug 78 will be shifted ninety degrees from its full to its dotted line position of Fig. 6, to in turn shift the locking plate 74 from its full to its dotted line position in this figure of the drawing. When the locking plate is so shifted, it will disengage the disc 58, thus permitting the disc 58, shaft 40, and knob 64 to be turned for the purpose of registering the index 62 with a selected numerical indicium 56.

It will thus be understood that when the device is unlocked, one may turn the knob 64 to cause the arm 62 to point to a particular indicium, as for example, "50." In the illustrated example this would mean that the vehicle cannot operate above fifty miles per hour, and of course, when the arm 62 points toward the number "50," the eccentric 44 (Fig. 2) will be so disposed as to limit swinging movement of the arm 20 beyond a position in which the throttle setting will permit operation in the vehicle at, but not above, fifty miles per hour. When the throttle setting has been established and set in this manner, the key is again turned in a reverse direction, to shift the locking plate into engagement with the disc 58, after which the key is removed, to cause the device to be locked at a desired setting.

In this way, a very simple means for governing the speed of the vehicle, and for causing the adjusted setting to be locked securely against being changed by unauthorized individuals, is provided.

In Figs. 8 and 9, the device is identical in all respects to that shown in the first form of the invention, with the exception that the device is mounted upon the steering post 88 of the vehicle, rather than upon the instrument panel 12. In this form of the invention, the device is mounted through the provision of a clamp 90 having a portion embracing the steering post, this portion being connected to a portion 92 that receives the casing 48, through the provision of a short connecting member 94 integral with the loop portions 90, 92. The top portions 90, 92 are provided with ends 96, 98 having openings registering with openings of the connecting member 94, to receive connecting screws 100. In this way, the dial is mounted upon the steering post, in position to be conveniently operated by the user as shown in Fig. 8. The loop portion 92, of course, would have an offset part 102 to receive the key and lock assembly. Otherwise, the device is identical to that of the first form.

In Fig. 10 there is illustrated another modification. In this form of the invention, the speed control device 14ᵃ may be mounted either upon the steering post or instrument panel, and includes a casing 48ᵃ having a side opening 103 in which is slidable a flexible shaft or Bowden cable 40ᵃ. Cable 40ᵃ extends radially, inwardly of the casing 48ᵃ and is provided within the casing with a rounded button or head 104 engaging the periphery of an eccentric 106 secured to and rotating with a stub shaft 108 journalled in the casing 48ᵃ. A toothed disc 58ᵃ is also secured to the stub shaft 108, and also rotating with the shaft 108 is a knob 64ᵃ and an index 62ᵃ traversing the calibrated dial of the device.

This form of the invention is particularly adapted for use with fuel injection systems, that is, systems in which fuel is supplied through a line 110 by an injection means, rather than by a carburetor. In this arrangement, the control of the vehicle speed is effected by selective positioning of a valve 116 provided in a valve housing 112. The shaft 117 of the valve is secured to a radial arm 114 exteriorly of the valve housing, and on the outer end of the arm 114 there is provided a swiveled lug 118 to which the Bowden cable 40ᵃ is connected.

By reason of this arrangement, when the key is operated to unlock the disc 58ᵃ, the knob 64ᵃ can be turned to locate the index arm 62ᵃ at a selected location on the calibrated dial. As a result, the disc 106 will be turned about its axis 108. Since the disc is eccentric to its axis of rotation, it will cause the shaft 40ᵃ to be shifted axially either inwardly or outwardly of the casing 48ᵃ in a radial direction, depending upon whether the speed setting is to be increased or reduced. The shaft or cable 40ᵃ, it will be understood, will as shown in Fig. 10 extend through a spring 120 interposed between the head 104 and the casing wall, so that the head 104 is always held in engagement with the periphery of the eccentric 106.

When the eccentric is turned in this manner to axially move the Bowden cable or shaft, the arm 114 will, of course, be swung either clockwise or counterclockwise, whichever is desired, and this will in turn selectively position the valve 116 to control the amount of fuel that can be injected into the motor through the line 110.

In all forms of the invention, the device is characterized by the ease with which it may be installed, by its low cost of manufacture, and by its simplicity of construction and operation. The device, further, may be installed with maximum facility in any conventional vehicle, and the installation is accomplished with minimum modification or redesign of the conventional vehicle parts. Normal operation of the vehicle is not interfered with to any degree by the device, but at the same time the device effectively controls the maximum speed at which the vehicle is permitted to operate. Further, not only is said maximum speed controlled effectively by the governor constituting the present invention, but also, at each setting of the device the locking mechanism is used for the purpose of insuring that the setting cannot be changed thereafter except by the vehicle owner or other individual with a key.

It is to be understood that this arrangement may be applied to any type of automobile engine including the overdrive type and may also be equipped with a push button arrangement to control the speed. The cable leading from the control dial or buttons to the governor is encased in steel tubing or the like to prevent unauthorized persons from tampering with the same.

The car may also be set on a "0" position of the dial and locked with a key which will prevent anyone from starting the engine.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A speed governor for a vehicle having a fuel control valve and a valve operating arm conjointly shiftable to regulate the speed at which the vehicle may be operated, comprising eccentric means adjustable by a user and adapted for controlling the positioning of said arm, and means for locking the eccentric means against movement from selected positions to which it is adjusted, said eccentric means comprising an eccentric disc, rotatably mounted in the path of movement of said arm to limit movement of the arm in one direction, said first-named means further including a flexible shaft secured to and rotatable with the disc, and a knob on the shaft adapted to be rotated by a user, whereby to rotate the shaft under the control of said user for adjustably positioning the eccentric disc relative to said arm, said governor further including a casing adapted to be mounted in a position accessible to a user, a dial on the casing calibrated to show various maximum speeds at which the vehicle is to be permitted to operate, and an index arm secured to said flexible shaft and traversing the calibrations of the dial responsive to rotation of the shaft, the knob being disposed exteriorly of the casing on the shaft.

2. A speed governor for a vehicle having a fuel control valve and a valve operating arm conjointly shiftable to regulate the speed at which the vehicle may be operated, comprising eccentric means adjustable by a user and adapted for controlling the positioning of said arm, and means for locking the eccentric means against movement from selected positions to which it is adjusted, said eccentric means comprising an eccentric disc rotatably mounted in the path of movement of said arm to limit movement of the arm in one direction, said first-named means further including a flexible shaft secured to and rotatable with the disc, and a knob on the shaft adapted to be rotated by a user, whereby to rotate the shaft under the control of said user for adjustably positioning the eccentric disc relative to said arm, said governor further including a casing adapted to be mounted in a position accessible to a user, a dial on the casing calibrated to show various maximum speeds at which the vehicle is to be permitted to operate, and an index arm secured to said flexible shaft and traversing the calibrations of the dial responsive to rotation of the shaft, the knob being disposed exteriorly of the casing on the shaft, said locking means including a toothed disc within the casing, a locking plate shiftable radially inwardly of the casing to engage the toothed periphery of the disc, a cylinder rotatably mounted upon the casing and having a connection to the locking plate such as to radially shift the locking plate responsive to rotation of the cylinder, and a key for rotating said cylinder.

3. A speed governor for a vehicle having a fuel control valve and a valve operating arm conjointly shiftable to regulate the speed at which the vehicle may be operated, comprising eccentric means adjustable by a user and adapted for controlling the positioning of said arm, and means for locking the eccentric means against movement from selected positions to which it is adjusted, said eccentric means comprising an eccentric disc rotatably mounted in the path of movement of said arm to limit movement of the arm in one direction, said first-named means further including a flexible shaft secured to and rotatable with the disc, and a knob on the shaft adapted to be rotated by a user, whereby to rotate the shaft under the control of said user for adjustably positioning the eccentric disc relative to said arm, said governor further including a casing adapted to be mounted in a position accessible to a user, a dial on the casing calibrated to show various maximum speeds at which the vehicle is to be permitted to operate, and an index arm secured to said flexible shaft and traversing the calibrations of the dial responsive to rotation of the shaft, the knob being disposed exteriorly of the casing on the shaft, said locking means including a toothed disc within the casing, a locking plate shiftable radially inwardly of the casing to engage the toothed periphery of the disc, a cylinder rotatably mounted upon the casing and having a connection to the locking plate such as to radially shift the locking plate responsive to rotation of the cylinder, and a key for rotating said cylinder, the locking means further including a barrel in which the cylinder is rotated, said barrel having guide slots receiving the locking plate to guide the locking plate during the radial movement thereof.

4. A speed governor for a vehicle having a fuel control valve and a valve operating arm conjointly shiftable to regulate the speed at which the vehicle may be operated, comprising eccentric means adjustable by a user and adapted for controlling the positioning of said arm, and means for locking the eccentric means against movement from selected positions to which it is adjusted, said eccentric means comprising an eccentric disc rotatably mounted in the path of movement of said arm to limit movement of the arm in one direction, said first-named means further including a flexible shaft secured to and rotatable with the disc, and a knob on the shaft adapted to be rotated by a user, whereby to rotate the shaft under the control of said user for adjustably positioning the eccentric disc relative to said arm, said governor further including a casing adapted to be mounted in a position accessible to a user, a dial on the casing calibrated to show various maximum speeds at which the vehicle is to be permitted to operate, and an index arm secured to said flexible shaft and trasversing the calibrations of the dial responsive to rotation of the shaft, the knob being disposed exteriorly of the casing on the shaft, said locking means including a toothed disc within the casing, a locking plate shiftable radially inwardly of the casing to engage the toothed periphery of the disc, a cylinder rotatably mounted upon the casing and having a connection to the locking plate such as to radially shift the locking plate responsive to rotation of the cylinder, and a key for rotating said cylinder, the locking means further including a barrel in which the cylinder is rotated, said barrel having guide slots receiving the locking plate to guide the locking plate during the radial movement thereof, said casing being adapted to be mounted upon the instrument panel of a vehicle.

5. A speed governor for a vehicle having a fuel control valve and a valve operating arm conjointly shiftable to regulate the speed at which the vehicle may be operated, comprising eccentric means adjustable by a user and adapted for controlling the positioning of said arm, and means for locking the eccentric means against movement from selected positions to which it is adjusted, said eccentric means comprising an eccentric disc rotatably mounted in the path of movement of said arm to limit movement of the arm in one direction, said first-named means further including a flexible shaft secured to and rotatable with the disc, and a knob on the shaft adapted to be rotated by a user, whereby to rotate the shaft under the control of said user for adjustably positioning the eccentric disc relative to said arm, said governor further including a casing adapted to be mounted in a position accessible to a user, a dial on the casing calibrated to show various maximum speeds at which the vehicle is to be permitted to operate, and an index arm secured to said flexible shaft and traversing the calibrations of the dial responsive to rotation of the shaft, the knob being disposed exteriorly of the casing on the shaft, said locking means including a toothed disc within the casing, a locking plate shiftable radially inwardly of the casing to engage the toothed periphery of the disc, a cylinder rotatably mounted upon the casing and having a connection to the locking plate such as to radially shift the locking plate responsive to rotation of the cylinder, and a key for rotating said cylinder, the locking means further including a barrel in which the cylinder is rotated, said barrel having guide slots receiving the locking plate to guide the locking plate during the radial movement thereof, said governor including clamp means for attaching the casing to the steering post of a vehicle.

6. A speed governor for a vehicle having a fuel control valve and a valve operating arm conjointly shiftable to regulate the speed at which the vehicle may be operated, comprising eccentric means adjustable by a user and adapted for controlling the positioning of said arm, and means for locking the eccentric means against movement from selected positions to which it is adjusted, said eccentric means comprising an eccentric disc, said governor including a casing, said eccentric disc being mounted within the casing, a shaft extending from the casing to said arm, said shaft having a head within the casing engaging the periphery of the disc for shifting the shaft in an axial direction responsive to rotation of the disc, whereby to swing said arm to selected positions.

7. A speed governor for a vehicle having a fuel control valve and a valve operating arm conjointly shiftable to regulate the speed at which the vehicle may be operated, comprising eccentric means adjustable by a user and adapted for controlling the positioning of said arm, and means for locking the eccentric means against movement from selected positions to which it is adjusted, said eccentric means comprising an eccentric disc, said governor including a casing, said eccentric disc being mounted within the casing, a shaft extending from the casing to said arm, said shaft having a head within the casing engaging the periphery of the disc for shifting the shaft in an axial direction responsive to rotation of the disc, whereby to swing said arm to selected positions, said locking means including a toothed disc within the casing rotating with the eccentric disc, a locking plate engageable with the toothed disc, and key-operated means for shifting the locking plate into and out of engagement with the toothed disc.

References Cited in the file of this patent

UNITED STATES PATENTS

| | | |
|---|---|---|
| 919,588 | Jones | Apr. 27, 1909 |
| 2,045,169 | Tong et al. | June 23, 1936 |
| 2,171,401 | McCoy | Aug. 29, 1939 |